United States Patent
Hubinette et al.

(10) Patent No.: US 9,769,018 B2
(45) Date of Patent: Sep. 19, 2017

(54) REPORTING TECHNIQUE FOR A TELECOMMUNICATIONS NETWORK

(71) Applicant: Telefonaktiebolaget L M Ericsson (publ), Stockholm (SE)

(72) Inventors: Ulf Hubinette, Linköping (SE); Robert Petersen, Linköping (SE); Anna Pucar Rimhagen, Motala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/417,857

(22) PCT Filed: Jan. 22, 2015

(86) PCT No.: PCT/EP2015/051243
§ 371 (c)(1),
(2) Date: Jan. 28, 2015

(87) PCT Pub. No.: WO2016/116158
PCT Pub. Date: Jul. 28, 2016

(65) Prior Publication Data
US 2016/0218920 A1  Jul. 28, 2016

(51) Int. Cl.
*H04L 12/24* (2006.01)
*H04L 12/26* (2006.01)
*H04W 24/08* (2009.01)
*H04W 24/06* (2009.01)

(52) U.S. Cl.
CPC ........ *H04L 41/0806* (2013.01); *H04L 43/062* (2013.01); *H04L 43/16* (2013.01); *H04W 24/06* (2013.01); *H04W 24/08* (2013.01)

(58) Field of Classification Search
CPC ... H04L 41/0806; H04L 43/062; H04L 43/16; H04W 24/08; H04W 24/06
USPC ........................................................ 370/254
See application file for complete search history.

(56) References Cited

U.S. PATENT DOCUMENTS

| 6,212,384 | B1* | 4/2001 | Almgren | ............... H04W 16/00 455/446 |
| 2008/0186862 | A1* | 8/2008 | Corbett | ............. H04W 72/0486 370/237 |
| 2009/0044280 | A1* | 2/2009 | Wu | ................... H04L 29/12367 726/26 |

(Continued)

FOREIGN PATENT DOCUMENTS

WO    2013160438 A2    10/2013

OTHER PUBLICATIONS

Brunner, M., "Probabilistic Decentralized Network Management", IFIP/IEEE International Symposium on Integrated Network Management, Jun. 1, 2009, pp. 25-32, IEEE.

(Continued)

*Primary Examiner* — Stephen J Clawson
(74) *Attorney, Agent, or Firm* — Coats & Bennett, PLLC (57) ABSTRACT

A technique for configuring the reporting of network elements to a management node in a telecommunications network is described. As to a method aspect of the technique, at least one of the network elements receives a configuration message. The configuration message is indicative of a reporting mode that is based on a probability function. The management data is reported to the management node depending on a condition that includes the probability function.

23 Claims, 7 Drawing Sheets

(56) References Cited

U.S. PATENT DOCUMENTS

| | | | |
|---|---|---|---|
| 2009/0163199 A1 | 6/2009 | Kazmi et al. | |
| 2009/0201861 A1* | 8/2009 | Kotecha | H04L 1/0027 370/329 |
| 2010/0027456 A1 | 2/2010 | Onggosanusi et al. | |
| 2010/0322176 A1 | 12/2010 | Chen et al. | |
| 2013/0290230 A1* | 10/2013 | Bodog | H04L 43/16 706/14 |
| 2013/0343299 A1 | 12/2013 | Sayana et al. | |

OTHER PUBLICATIONS

3GPP. "Technical Specification Group Services and System Aspects; Telecommunication management; Integration of device management information with Itf-N (Release 10)" 3GPP TR 32.827 V10.1.0. Jun. 2010. 3GPP, Sophia Antipolis, France.

International Search Report, International application No. PCT/EP2015/051243. Date of mailing: Sep. 14, 2015. European Patent Office, Rijswijk, NL.

* cited by examiner

REPORTING TECHNIQUE FOR A TELECOMMUNICATIONS NETWORK

TECHNICAL FIELD

The present disclosure generally relates to reporting in a telecommunications network. More specifically, and without limitation, methods and devices for configuring the reporting of management data are provided.

BACKGROUND

In existing telecommunications networks, network elements (NEs) report management data, for Operation, Administration and Maintenance (OAM) or for managing resources of a Radio Access Network (RAN). By way of example, heterogeneous mobile telephony networks comprise a large number of NEs that transfer management data.

In existing management solutions, all NEs are transferring their management data to the management system essentially as the measurement occurs. In an expanding telecommunications network with a growing number of NEs of different sizes and importance, the amount of management data transferred from the NEs to a management system increases to an extent that occupies significant portions of limited system resources such as CPU, memory and transmission capacity at various locations in the telecommunications network.

SUMMARY

Accordingly, there is a need for a technique that efficiently structures data management reporting in a distributed telecommunications network.

As to one aspect, a method of configuring network elements of a telecommunications network for reporting management data to a management node is provided. The method comprises the following steps performed by at least one of the network elements: a step of receiving a configuration message, wherein the configuration message is indicative of a reporting mode based on a probability function; and a step of reporting management data to the management node depending on a condition, wherein the condition includes the probability function.

The reporting mode that is based on the probability function may also be referred to as a probabilistic reporting mode or a random reporting mode. A network management system configuring at least some network elements for the probabilistic reporting mode may also be referred to as a probabilistic management system.

The network elements within the telecommunications network may be configured according to different reporting modes. The different reporting modes may include an active reporting mode, a passive reporting mode and the probabilistic reporting mode. The network operator can assign the at least one network element either to be in the active mode (i.e., management data is pushed to the management node as soon as the data is available without delay), the passive mode (i.e., the management node pulls the management data from the network elements when the management node requires it) or the probabilistic reporting mode (i.e., the network element pushes the management data to the management node depending on an evaluation result of the probability function implemented in the network element).

Configuring at least some of the network elements according to the probabilistic reporting mode and/or configuring the network elements according to different reporting modes can regulate network load caused by the reporting in some embodiments, alternatively or in addition, the probabilistic reporting mode can temporally decouple the network load caused by the reporting in some embodiments. E.g., in some growing mobile telephony network with a large number of network elements, the growing amount of reported management data can be handled by configuring at least some network elements according to an embodiment of the technique.

By assigning the network elements to different reporting modes, including the probabilistic reporting mode, the amount of overall transferred management data can be regulated, and thus the general load or a peak load, e.g., on a processor and on transmission resources, can be lowered in at least some embodiments.

The at least one network element may include a cell, a radio base station and/or any other component of the telecommunications network. At least some of the network elements may include physical network entities e.g., radio base stations, and/or logical network entities, e.g. cells. Same or at least some other network elements may be indirectly associated with a cell of the telecommunications network, e.g., via a radio base station serving the cell.

The management node may be one of a plurality of management nodes in the telecommunications network. The telecommunications network may be partitioned so that each of the reporting network elements is uniquely associated with one of the management nodes. The management node associated to the network element may be specified by the configuration message sent to and received by the network element.

The configuration message may specify that the probabilistic reporting mode be configured. The configuration message may further be indicative of the probability function as such. The probability function may be expressly defined by the configuration message and/or the configuration message may be indicative of parameters for the probability function.

The management data may be measured during a measurement interval, e.g., at the network element. The probability function may be evaluated, e.g., at an end of the measurement interval and/or by the network element. The management data may include, or provide a basis for, at least one of performance measurement data, trace data and low-level alarms. The measured management data may be buffered at the network node, e.g., until the condition is fulfilled and/or the management data has been reported.

The probability function may determine whether the management data is to be sent to the management node upon request or without a request by the management node. Alternatively or in addition, the condition may be suspensive and the probability function may determine whether or not the management data is reported at a certain point in time, e.g., at the time of evaluating the probability function. The result of the evaluation may be binary. Optionally, the probability function may determine a point in time or a delay interval at which the management data is reported.

The probability function may depend on importance and/or a status (e.g., a workload) of the at least one network element. The probability for delayed reporting may increase with the workload and/or may decrease with importance. The dependency may further improve a balanced utilization of resources (at the network element and/or across the network). The dependency allows regulating how and/or when the management data is transferred from the network elements to the management node in at least some embodiments.

According to another aspect, a method of configuring network elements of a telecommunications network for reporting management data to a management node is provided. The method comprises the following steps performed by the management node: a step of selecting a group of the network elements for a reporting mode that is based on a probability function; and a step of sending a configuration message to each network element in the group, wherein the configuration message is indicative of the reporting mode that is based on the probability function.

Any feature disclosed in the context of the one method aspect may be implemented in the context of the other method aspect. Any step corresponding to a step disclosed in the context of the one method aspect may also be performed in the context of the other aspect.

According to a further aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download via a data network, e.g., the telecommunications network and/or the Internet.

According to one hardware aspect, a device for configuring network elements of a telecommunications network for reporting management data to a management node is provided. The device comprises: a receiving unit adapted to receive a configuration message, wherein the configuration message is indicative of a reporting mode based on a probability function; and a reporting unit adapted to report management data to the management node depending on a condition, wherein the condition includes the probability function.

According to another hardware aspect, a device for configuring network elements of a telecommunications network for reporting management data to a management node is provided. The device comprises: a selecting unit adapted to select a group of the network elements for a reporting mode based on a probability function; and a sending unit adapted to send a configuration message to each network element in the group, wherein the configuration message is indicative of the reporting mode that is based on the probability function.

Any one of the units of the devices, or a further dedicated unit, may be adapted to perform any one of the steps disclosed in the context of the method aspect. Furthermore, the devices may comprise any feature disclosed in the context of the method aspect.

BRIEF DESCRIPTION OF THE DRAWINGS

In the following, the present disclosure is described in more detail with reference to exemplary embodiments illustrated in the drawings, wherein.

DETAILED DESCRIPTION

In the following description, for purposes of explanation and not limitation, specific details are set forth, such as specific network environments and specific transmission scenarios in order to provide a thorough understanding of the technique disclosed herein. It will be apparent to one skilled in the art that the technique may be practiced in other embodiments that depart from these specific details. Moreover, while the following embodiments are primarily described for a mobile transmitter operating according to Long Term Evolution (LTE), it will be readily apparent that the technique described herein may also be implemented in other mobile and stationary communication networks, including GSM networks, UMTS networks, LTE-Advanced networks and next-generation antenna arrays.

Moreover, those skilled in the art will appreciate that the functions, steps and units explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the functions, steps and implement the units disclosed herein.

Figure 1:
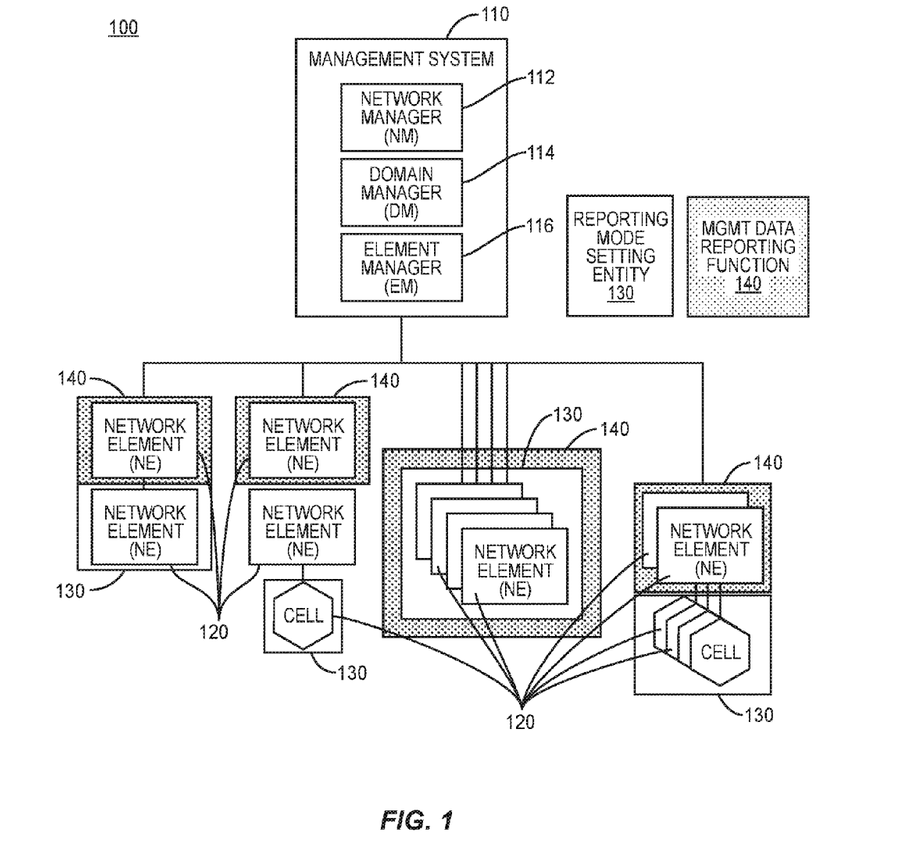
FIG. 1 schematically illustrates a telecommunications network comprising a network management system and a plurality of network elements.

FIG. 1 schematically illustrates a telecommunications network 100 as an exemplary environment for implementing the technique. The telecommunications network 100 comprises a Management System 110 (also referred to as management node) and a plurality of Network Elements (NEs) 120 that report to the management node 110.

The NE 120 may relate to any component or entity of the telecommunications network 100. For example, the NEs 120 may include physical and/or logical components of the telecommunications network 100. A physical component includes, e.g., any component of a Radio Access Network such as a Radio Base Station and/or of a Core Network such as gateway. A logical component includes, e.g., a cell of the telecommunications network 100.

The management node 110 comprises one or several of the following manager units a Network Manager (NM) unit 112, a Domain Manager (DM) unit 114 and an Element Manager (EM) unit 116. The manager units 112 to 116 may interact in different configurations, e.g., depending on a type of the telecommunications network 100.

The NEs 120 report management data to the management node 110. The management data may include performance measurement data, trace data and/or low-level alarm information. The performance measurement data may include a Reference Signal Received Power (RSRP) and/or a Signal to Noise and Interference Ratio (SNIR), e.g. as measured at one of the Radio Base Stations of the telecommunications network 100.

The NEs 120 that are associated with the management node 110 generate a large amount of management data, which needs to be transferred to the management node 110. The management data is transferred by a Management Data Reporting Function 140. The Management Data Reporting Function 140 may be implemented at some of the NEs 120. In the exemplary telecommunications network 100 shown in FIG. 1, in each domain or chain of NEs 120 along which the management data is reported, the NE 120 topologically closest to the management node 110 comprises the Management Data Reporting Function 140.

For the purpose of configuring the NEs 120, at least some of the NEs are associated with groups 130. The groups 130 may be disjoint proper subsets of the NEs associated with the management node 110. A reporting mode is specified by the management node 110 for each of the groups 130. Each NE 120 within the group 130 reports according to the reporting mode specified for the group 130. A Reporting Mode Setting Entity configured to set the reporting mode is implemented at the NE 120 or the group 130 for which the Reporting Mode Setting Entity is setting the reporting mode. Alternatively or in addition, the Reporting Mode Setting Entity is implemented at the Management Data Reporting Function 140.

The telecommunications network 100 may be implemented as a cellular telecommunications network, e.g., a mobile telephony network. The telecommunications network 100 may comprise a large number (e.g., more than 100) of physical NEs (e.g., Radio Base Stations) and/or logical NEs (e.g., cells). Alternatively or in addition, the telecommunications network 100 may be heterogeneous. E.g., the NEs 120 may have various sizes and/or may differ in importance (e.g., as to a reliable radio access provided by the telecommunications network 100 to user equipments). A network operator can manage the telecommunications network 100 using the management node 110, e.g., a user interface of the NM 112.

Figure 2:
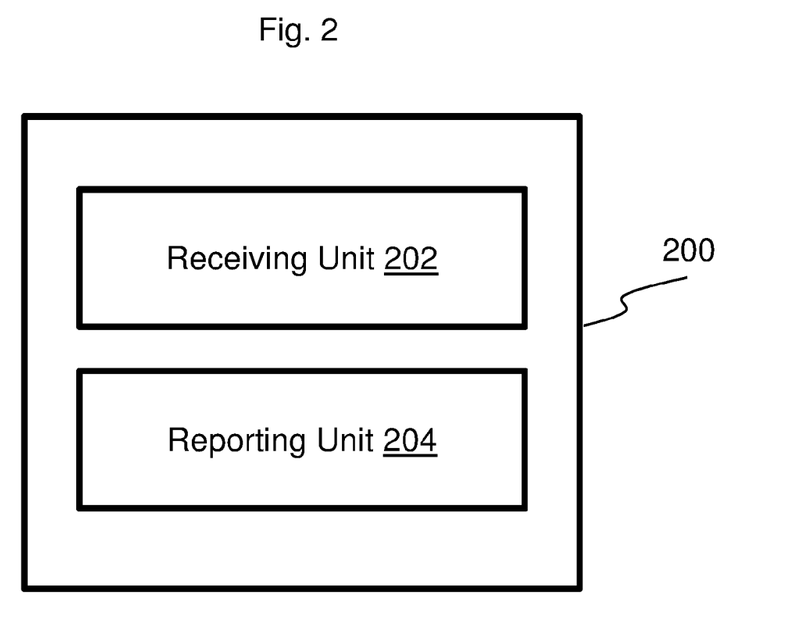
FIG. 2 shows a schematic block diagram of a device for configuring network elements, which is implementable at any one of the network elements.

FIG. 2 shows a schematic block diagram of a device 200 for configuring network elements, e.g., the NEs 120, of a telecommunications network for reporting management data to a management node. The device 200 may be implemented at any one of the NEs 120 or at any one of the groups 130. The device 200 comprises a receiving unit 202 for receiving a configuration message that specifies a reporting mode. The receiving unit 202 optionally implements the Reporting Mode Setting Entity that sets the reporting mode for the associated NEs 120 according to the received configuration message. The device 200 further comprises a reporting unit 204, e.g., the Management Data Reporting Function 140, for conditionally reporting the management data.

Figure 3:
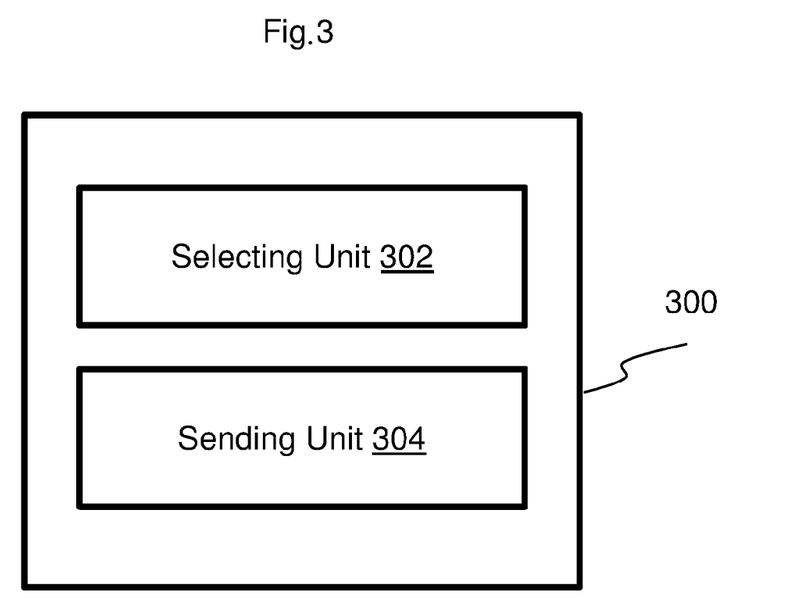
FIG. 3 shows a schematic block diagram of a device for configuring network elements, which is implementable at the network management system.

FIG. 3 shows a schematic block diagram of a device 300 for configuring network elements of a telecommunications network for reporting management data to a management node, e.g., the Management System 110. The device 300 may be implemented at the management node 110. The device 300 comprises a selecting unit 302, e.g., the DM unit 114, for selecting a group of network elements for a specific reporting mode. The device 300 further comprises a sending unit 304, e.g., the EM unit 116, for sending a configuration message to the network elements within the selected group to trigger setting the specific reporting mode.

Figure 4:
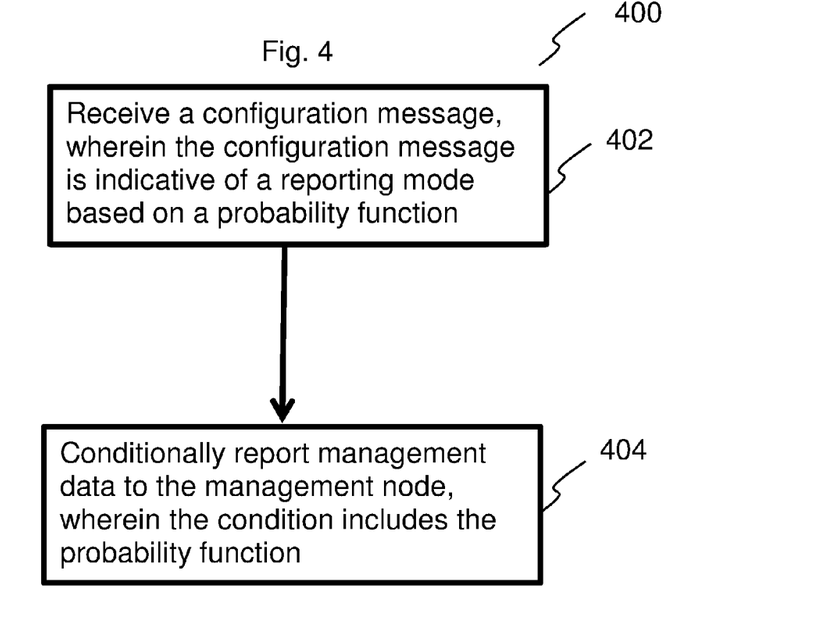
FIG. 4 shows a flowchart for a method of configuring network elements, which is implementable at any one of the network elements.

FIG. 4 shows a flowchart of a method 400 for configuring network elements (e.g., the NEs 120) of a telecommunications network (e.g., the network 100) for reporting management data to a management node (e.g., the Management System 110). The method may be implemented by the device 200. In a step 402 of the method 400, a configuration message is received. The received message specifies a reporting mode based on a probability function. In a step 404 of the method 400, the management data is reported to the management node depending on a condition that includes the probability function. In an embodiment of the device 200, the units 202 and 204 are configured to perform the steps 402 and 404, respectively.

Figure 5:
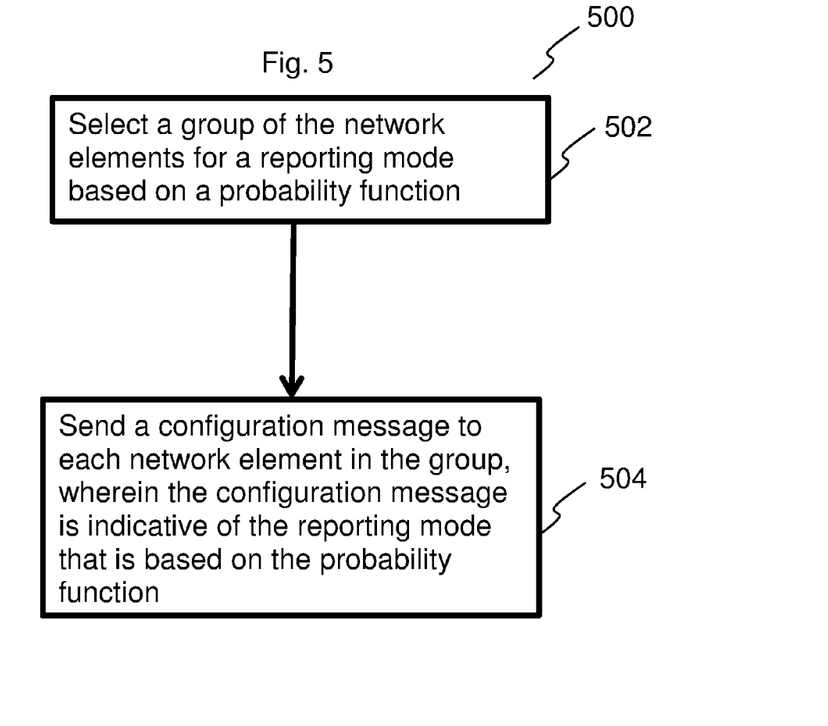
FIG. 5 shows a flowchart for a method of configuring network elements, which is implementable at the network management system.

FIG. 5 shows a flowchart of a method 500 for configuring network elements (e.g., the NEs 120) of a telecommunications network (e.g., the network 100) for reporting management data to a management node (e.g., the Management System 110). The method 500 may be implemented by the device 300. In a step 502 of the method 500, one or more groups of network elements (e.g., the groups 130) are selected to be configured for a reporting mode that is based on a probability function. In a step 504 of the method 500, a configuration message is sent towards the network elements associated with the selected group. The configuration message requires the network elements to change their configuration to the reporting mode based on the probability function. In an embodiment of the device 300, the units 302 and 304 are configured to perform the steps 502 and 504, respectively.

A control attribute is defined at management interfaces of the devices 200 and 300. The control attribute controls the setting of the reporting modes. The control attribute allows specifying the reporting mode (also referred to as reporting state), including the reporting mode that is based on the probability function (probabilistic reporting mode). The probabilistic reporting mode is one optional state of the control attribute.

The technique may be implemented for an enhanced UMTS Terrestrial Radio Access Network (eUTRAN), for an UTRAN and/or for a GSM EDGE Radio Access Network (GERAN) as the telecommunications network 100. A Network Resource Model is specified in documents 3GPP SA5 TS 28.657, 28.658 and 28.659 (Rel-13) for the eUTRAN, in documents 3GPP SA5 TS 28.651, 28.652 and 28.653 (Rel-13) for the UTRAN, and in documents 3GPP SA5 TS 28.654, 28.655 and 28.656 (Rel-13) for the GERAN. In an exemplary 3GPP implementation, the control attribute is included in the Network Resource Model (NRM) Integration Reference Points (IRPs), e.g., in addition to the IRPs specified in document 3GPP TS 32.150 (V12.0.0).

The device 300, e.g., the management node 110, selectively assigns different reporting modes to the NEs 120 (e.g., cells) or to the groups 130 of NEs 120 by communicating with the device 300 for triggering the receiving unit 202, e.g., the Reporting Mode Setting Entity, to set the communicated reporting mode.

The different reporting modes include an active mode, a passive mode and the probabilistic reporting mode (also referred to as a random mode). In the active mode, the reporting unit 204, e.g., the Management Data Reporting Function, pushes the management data to the management node 110 when the management data becomes available in the NE 120. In the passive mode, the reporting unit 204, e.g., the Management Data Reporting Function, transfers the management data only when the management node 110 requests (e.g., pulls) the management data from the NE 120. In the probabilistic mode, the reporting unit 204, e.g., the Management Data Reporting Function, pushes the management data to the management node 110 at a time determined by the probability function. The reporting unit 204 evaluates the probability function.

The management node 110, e.g., the NM 112 responsive to a first input of a network operator, defines the probability function or selects the probability function among a plurality of predefined probability functions. Optionally, the probability function is defined by parameters or symbolic expressions that are input by the network operator. For a suspensive condition in the step 404, the probability function determines a random reporting delay, e.g. for sending the management data to the management node 110 after the management data has become available in the NE 120. The definition of the probability function includes at least one of an average reporting delay interval and a distribution of the reporting delay interval. The management data may be sent according to a stochastic process, e.g., a Poisson process with constant intensity. For a conditional push transfer in the step 404, the definition of the probability function includes a probability p, wherein $0<p<1$, for sending the management data to the management node 110 when the management data becomes available in the NE 120. Furthermore, the conditions and/or the definitions may be combined.

By defining or selecting a suitable probability function, the overall resource usage (e.g., time for a Central Processing Unit, CPU, and capacity for data transfer) in the whole telecommunications network 100 can be balanced, e.g., by more uniformly distributing resource usage over time.

The probability function is used in the step 404 by the reporting unit 204, e.g., by the Management Data Reporting Function, to control the transfer of management data from the associated one or more NEs 120 that are set to the probabilistic reporting mode.

The management node 110, e.g. the DM 114 responsive to a second input of the network operator, defines the groups 130 of NEs 120 (e.g., cells), which are subject for assignment of one of the reporting modes. The mechanism of setting the reporting modes by communicating the configuration message, e.g., specifying the control attribute, is applicable to physical NEs (e.g., a base station) as well as to logical entities (e.g., a cell).

The management node 110, e.g. the NM 112 responsive to a third input of the network operator, assigns to each NE 120 or group 130 of NEs 120 a reporting mode. Setting the assigned reporting mode is controlled by the Reporting Mode Setting Entity in the receiving unit 202. The optional reporting modes for the assignment include the active mode, the passive mode and the probabilistic mode. By default, e.g. in the absence of the third input, the active mode is assigned.

The management node 110 sets and/or changes the reporting mode for a specific one of the NEs 120 (e.g., a cell) or for a group of NEs 120 so that the NEs 120 are assigned different reporting modes. Assigning the reporting mode includes defining or selecting the probability function per NE 120 or per group 130 of NEs 120. In a first embodiment for a heterogeneous telecommunications network 100, the groups 130 are structured depending on a network structure. E.g., NEs 120 associated with picocells, microcells and microcells are respectively grouped.

In a second embodiment combinable with the first embodiment, the NEs 120 are assigned different reporting modes based on their importance, frequency of use and/or workload. NEs 120 that are of high importance (e.g., operationally critical) or frequently used are configured either so that the management data transfer is activated with high probability p, wherein $0.5<p<1$, or are configured to the active mode. For example, in the order of decreasing importance, only the x percent most important NEs 120 are configured for the active mode. The y percent less important NEs 120 (i.e., the y percent most important NEs 120 that are not configured for the active mode) are configured for the probabilistic reporting mode. The probability for push transfer may be a monotonically increasing function of the importance and the frequency of use and/or a monotonically decreasing function of the workload. The remaining NEs 120 (if any) are configured for the passive mode. By way of example, x=10% and y=40%.

The reporting mode is configured by the receiving unit 202 (e.g., using the Reporting Mode Setting Entities), per NE 120 and/or per group 130 of NEs 120. The reporting unit 204 (e.g., the Management Data Reporting Function 140) handles the transfer of the management data from the NEs 120 to the management node 110 according to the configured reporting mode.

The reporting unit 204 reports the management data as soon as the management data becomes available in the associated NE 120, if the associated NE 120 or group 130 is configured for the active reporting mode (also referred to as push method). The reporting unit 204 reports management data only when the management node 110 requests the management data, if the associated NE 120 or group 130 is configured for the passive reporting mode will (also referred to as pull method). The reporting unit 204 reports the management data at a time determined by the probability function (e.g., a probability distribution function), if the associated NE 120 or group 130 is configured for the probabilistic reporting mode. The probabilistic mode may be implemented by subjecting the push transfer of the active mode to the condition that includes the probability function.

An exemplary implementation of the control attribute is described. The control attribute is denoted by "reportingState". The control attribute holds information of the reporting mode (or reporting state). In an exemplary 3GPP implementation, the control attribute indicates that the IRPAgent shall, provided that management data (e.g. performance measurement data or trace data) has been collected, send the collected management data as soon as it is available according to the active reporting mode or send the collected management data at a time determined by the probability function according to the probabilistic reporting mode. Values allowed for the control attribute include "Active" and "Random", respectively.

A data type for the control attribute is structured according to at least one of the following requirements. The multiplicity of the control attribute is equal to 1 (so that there is exactly one instance per NE 120 or group 130), the control attribute is initialized as "Active" and the control attribute is nullable (i.e., the control attribute may be set to null in addition to the values "Active" and "Random") for configuring the passive mode.

Figure 6:
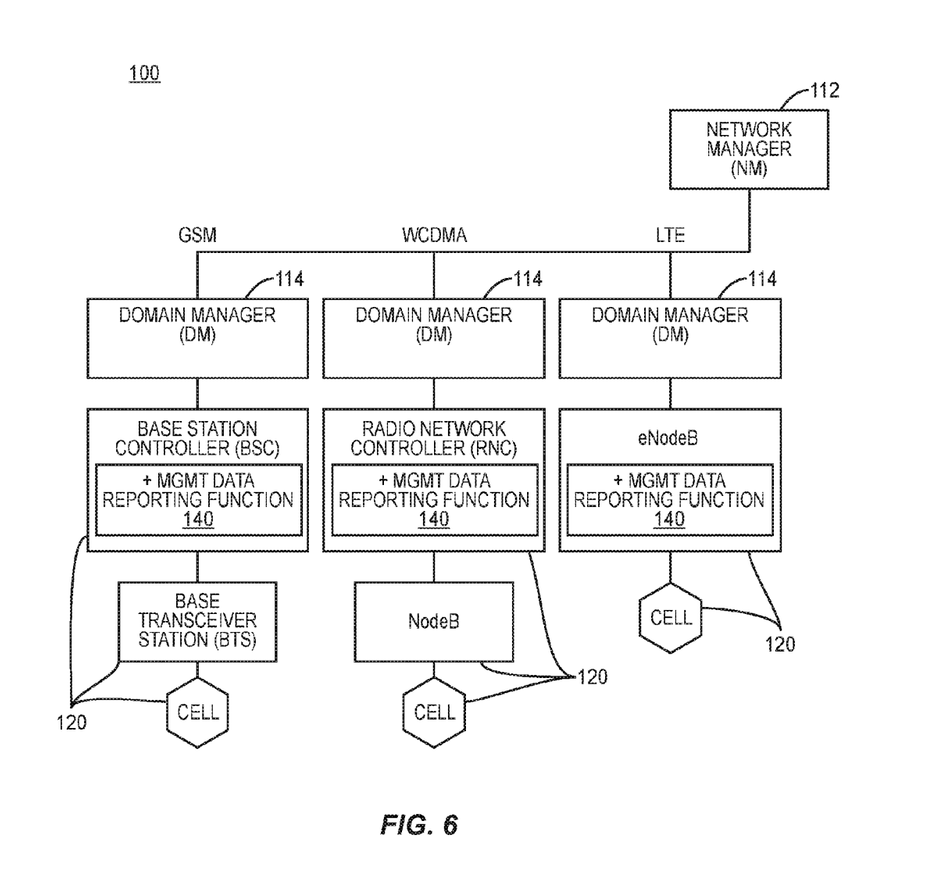
FIG. 6 schematically illustrates a telecommunications network comprising a network management system and a plurality of network elements for multiple Radio Access Technologies.

A reporting structure and/or a location and distribution of the device 200 (e.g., of the reporting unit 204 performing the Management Data Reporting Function 140) varies in different types of network configurations. FIG. 6 schematically illustrates a telecommunications network 100 as another exemplary environment for implementing the technique. Like reference signs indicate corresponding features. The technique is implementable in any telecommunications network 100 and not limited to the types of network configurations shown in FIGS. 1 and 6.

Figure 7:
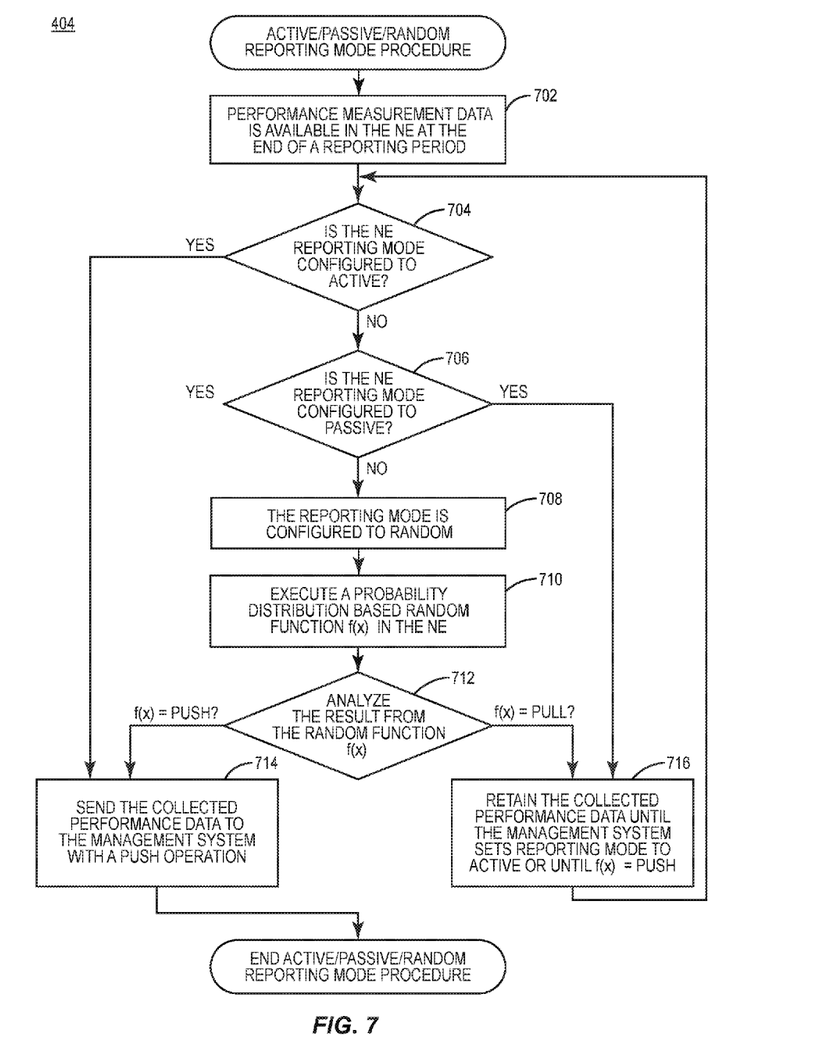
FIG. 7 shows a flowchart for an implementation of a conditional reporting step of the method of FIG. 4.

FIG. 7 shows a flowchart of an exemplary implementation of the reporting step 404 performable by the reporting unit 204. For clarity and not limitation, the NE 120 associated with the reporting unit 204 can be configured to any one of the management data reporting modes "ACTIVE", "PASSIVE" and "RANDOM".

In a substep 702 of the step 404, availability of a performance measurement data collection (as an example for the management data) is determined. Branching substep 704 assesses whether or not the NE 120 is configured for the active mode. In the active mode, the reporting unit 204 sends the performance measurement data collection to the management node 110 in a substep 714. Otherwise, branching substep 706 assesses whether or not the NE 120 is configured for the passive mode. In the passive mode, the reporting unit 204 buffers the performance measurement data collection according to a substep 716 and the reporting unit 204 proceeds at the substep 704.

Otherwise, the reporting unit 204 determines in a substep 708 that the NE is configured for the probabilistic mode. The probability function is evaluated in a substep 710, e.g., based on a probability distribution. A result of the evaluation is binary (or compared with a threshold value, which yields the binary result) in a substep 712. If the probabilistic mode has been configured, the reporting step 404 can either push or pull depending on the result of the evaluation of the probability function. The result may determine whether the performance measurement data collection is pushed to the management node 110 in the substep 714 or available for pulling by the management node 110 in the substep 716.

Figure 8:
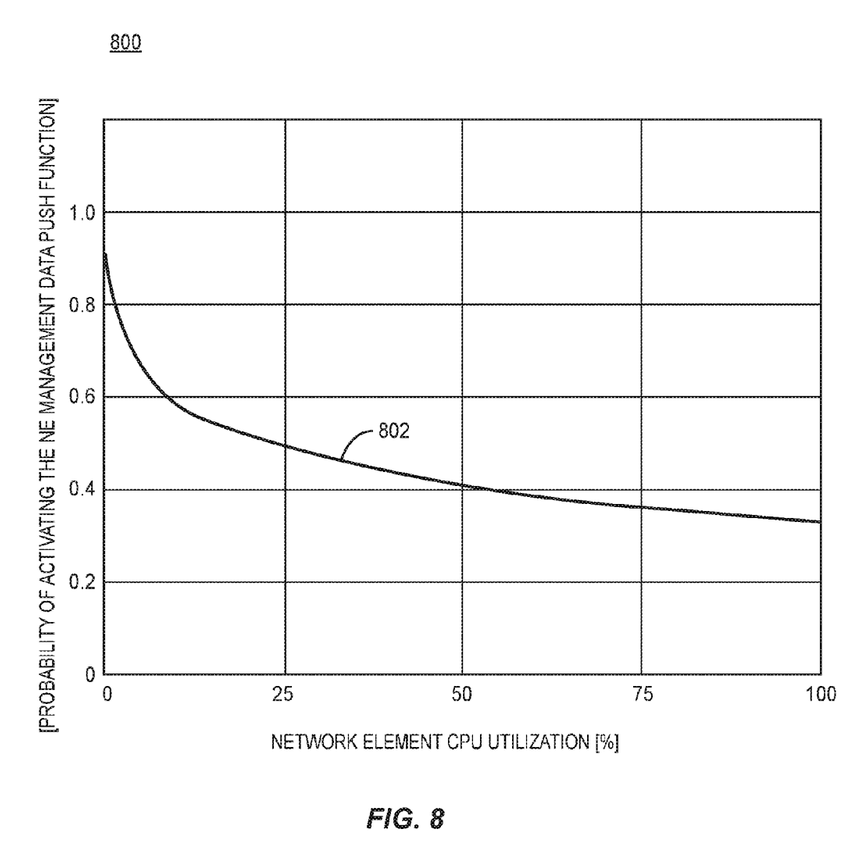
FIG. 8 shows a diagram for a first dependency of a probability function implementable at any one of the network elements.

FIG. 8 shows a diagram 800 including a graph 802 of an exemplary probability function. The probability for pushing the report according to the substep 714 is shown on the vertical axis. The probability function depends on a local network characteristic, e.g., the frequency of use or a workload e.g., (memory utilization or CPU load) of the NE 120, which is shown on the horizontal axis in FIG. 8.

The exemplary probability function shown in FIG. 8 is based on an exponential distribution function, e.g., of the CPU load in the NE 120. For instance, if at a time T1, the CPU utilization is measured to be 75% the probability that the management data push mode is activated at T1 will be 0.35. If at a time T2, the CPU utilization is measured to be 5%, the probability that the management data push mode is activated at T2 will be 0.7.

Figure 9:
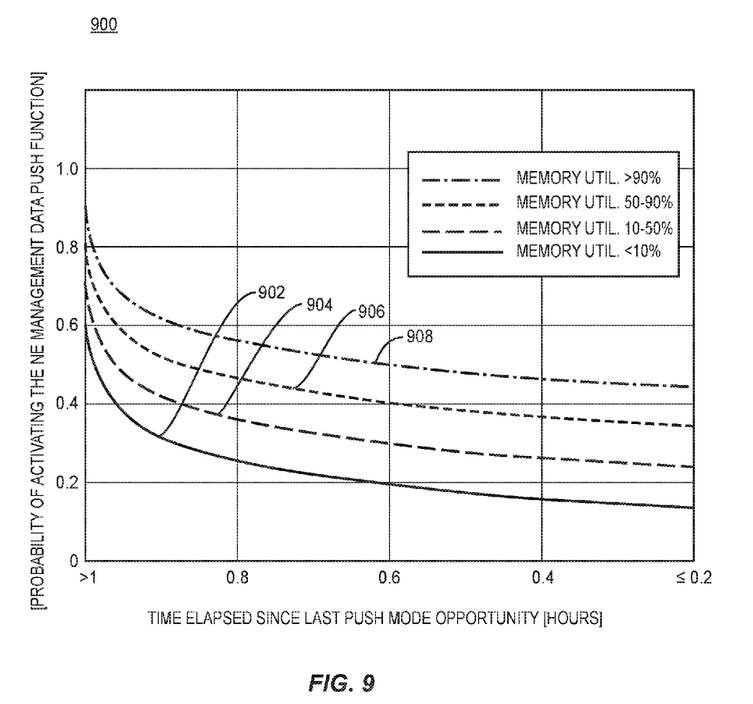
FIG. 9 shows a diagram for a second dependency of a probability function implementable at any one of the network elements.

Another exemplary diagram 900 for the probability function is illustrated in FIG. 9. Since a parameter of the probability function (namely, memory utilization) and not its probability variable is indicated in the inset, graphs 902 to 908 illustrate the likelihood of the NE 120 to enter push mode. The likelihood depends on an average memory utilization of the NE 120 and/or a time elapsed since the last opportunity when the pushing step 714 was entered.

FIG. 9 illustrates examples for a probabilistic reporting mode, wherein the probability of activating the push mechanism 714 of the NE 120 is an exponential distribution function of the time elapsed since the last pushing step 714 opportunity for the NE 120. In addition, the memory utilization of the NE 120 is a parameter to the probability function. The higher the utilization of the memory (occupied by e.g., measurement data that is buffered for transfer), the higher the probability for the activation of the management data pushing step 714. E.g., the probability function increases according to the graphs 902 to 908 as the memory utilization increases from 10 to 90 percent.

As has become apparent from above exemplary embodiments, by assigning network elements to different reporting modes, the amount of transferred management data (e.g., generated by a large number of network elements in a heterogeneous network), and thus the load on the system resources, can be regulated over time.

By having the possibility to assign the network elements to a random reporting mode, the total load on system resources (such as CPU, memory and transmission capacity in the network) can be automatically regulated, without the need for the network operator to assign a fixed active or passive reporting mode to each network element (e.g., each cell) or group thereof.

Assigning a network element, or a group thereof, to the random reporting mode, means that a probability function will determine whether the network element will use a push reporting mechanism or a pull reporting mechanism at a certain time. By selecting a suitable probability function, the overall reporting behavior in the network can result in a better general use of system resources, such as CPU capacity, memory and management data transmission capacity. The random reporting mode can be especially useful for those network elements that to a large degree have a non-deterministic behavior.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method, implemented by a device, of configuring a network element of a telecommunications network for reporting management data to a management node, the method comprising the device:
   receiving a configuration message, wherein the configuration message indicates that the network element is to operate in a probabilistic reporting mode that is based on a probability function, wherein the probabilistic reporting mode is one of multiple reporting modes supported by the network element; and
   reporting management data to the management node depending on a condition, wherein the condition includes the probability function, and wherein the probability function defines when to report management data.

2. The method of claim 1, wherein the network element includes a cell or a radio base station of the telecommunications network.

3. The method of claim 1, wherein the management node is specified by the configuration message.

4. The method of claim 1, wherein the configuration message is indicative of parameters of the probability function.

5. The method of claim 1, further comprising measuring the management data during a measurement interval.

6. The method of claim 5, further comprising evaluating the probability function at an end of the measurement interval.

7. The method of claim 5, further comprising buffering the measured management data until the condition is fulfilled.

8. The method of claim 1, wherein the condition is suspensive and the probability function determines a point in time at which the management data is reported.

9. The method of claim 1, wherein the probability function depends on a workload of the network element.

10. The method of claim 1, wherein the probability function defines a point in time until which to delay the reporting of management data.

11. The method of claim 1, wherein the probability function defines a delay interval for which to delay the reporting of management data.

12. The method of claim 1, wherein the device evaluates the probability function to determine an output, and the device, based on the output, makes a determination between reporting the management data upon a request by the management node and reporting the management data without a request by the management node.

13. The method of claim 1, wherein the network element is the device.

14. A method of configuring network elements of a telecommunications network for reporting management data to a management node, the method comprising the management node:
selecting a group of the network elements for a reporting mode from multiple reporting modes supported by the network elements, wherein the multiple reporting modes comprise a probabilistic reporting mode that is based on a probability function, wherein the probability function defines when to report management data;
sending a configuration message to each network element in the group, wherein the configuration message is indicative of the probabilistic reporting mode; and
receiving, at the management node, management data reported from the group of the network elements in accordance with the configuration message.

15. The method of claim 14, wherein the multiple reporting modes comprise an active reporting mode, wherein the active reporting mode indicates that management data is reported as determined by the network element independent of a probability function.

16. The method of claim 14, wherein the selecting the group of the network elements comprises selecting a first group, and the method further comprises selecting a second group of network elements for a second reporting mode from the multiple reporting modes that is different than the probabilistic reporting mode, wherein the reporting modes of the different groups of network elements are different reporting modes.

17. The method of claim 14, wherein the probability function defines a point in time until which to delay the reporting of management data, or the probability function defines a delay interval for which to delay the reporting of management data.

18. A computer program product stored in a non-transitory computer readable medium for configuring a network element of a telecommunications network for reporting management data to a management node, the computer program product comprising software instructions which, when run on one or more processors of a device, causes the device to:
receive a configuration message, wherein the configuration message indicates that the network element is to operate in a probabilistic reporting mode that is based on a probability function, wherein the probabilistic reporting mode is one of multiple reporting modes supported by the network element; and
report management data to the management node depending on a condition, wherein the condition includes the probability function, wherein the probability function defines when to report management data.

19. The computer program product of claim 18, wherein the network element is the device.

20. A computer program product stored in a non-transitory computer readable medium for configuring network elements of a telecommunications network for reporting management data to a management node, the computer program product comprising software instructions which, when run on one or more processors of the management node, causes the management node to:
select a group of the network elements for a reporting mode from multiple reporting modes supported by the network elements, wherein the multiple reporting modes comprise a probabilistic reporting mode that is based on a probability function, wherein the probability function defines when to report management data;
send a configuration message to each network element in the group, wherein the configuration message is indicative of the probabilistic reporting mode; and
receive, at the management node, management data reported from the group of the network elements in accordance with the configuration message.

21. A device for configuring a network element of a telecommunications network for reporting management data to a management node, the device comprising a processor and a memory, the memory containing instructions executable by the processor whereby the device is operative to:
receive a configuration message, wherein the configuration message indicates that the network element is to operate in a probabilistic reporting mode that is based on a probability function, wherein the probabilistic reporting mode is one of multiple reporting modes supported by the network element; and
report management data to the management node depending on a condition, wherein the condition includes the probability function, and wherein the probability function defines when to report management data.

22. The device of claim 21, wherein the network element is the device.

23. A device for configuring network elements of a telecommunications network for reporting management data to a management node, the device comprising a processor and a memory, the memory containing instructions executable by the processor whereby the device is operative to:
select a group of the network elements for a reporting mode from multiple reporting modes supported by the network elements, wherein the multiple reporting modes comprise a probabilistic reporting mode that is based on a probability function, wherein the probability function defines when to report management data;
send a configuration message to each network element in the group, wherein the configuration message is indicative of the probabilistic reporting mode; and
receive management data reported from the group of the network elements in accordance with the configuration message.

* * * * *